(12) United States Patent
Wang et al.

(10) Patent No.: US 12,499,708 B2
(45) Date of Patent: Dec. 16, 2025

(54) METHOD AND APPARATUS FOR MEASURING GAZE DIFFERENCE BASED ON GAZE ESTIMATION

(71) Applicants: Zhongshan Ophthalmic Center, Sun Yat-Sen University, Guangdong (CN); Tsinghua University, Beijing (CN)

(72) Inventors: Ruixin Wang, Guangdong (CN); Haotian Lin, Guangdong (CN); Feng Xu, Beijing (CN); Xinping Yu, Guangdong (CN); Junfeng Lyu, Beijing (CN)

(73) Assignees: Zhongshan Ophthalmic Center, Sun Yat-Sen University, Guangzhou (CN); Tsinghua University, Beijing (CN)

( * ) Notice: Subject to any disclaimer, the term of this patent is extended or adjusted under 35 U.S.C. 154(b) by 358 days.

(21) Appl. No.: 18/225,676

(22) Filed: Jul. 24, 2023

(65) Prior Publication Data

US 2024/0221423 A1      Jul. 4, 2024

(30) Foreign Application Priority Data

Dec. 28, 2022   (CN) .......................... 202211693813.4

(51) Int. Cl.
| | |
|---|---|
| *G06V 40/18* | (2022.01) |
| *G06V 10/26* | (2022.01) |
| *G06V 10/82* | (2022.01) |
| *G06V 20/40* | (2022.01) |
| *G06V 40/16* | (2022.01) |

(52) U.S. Cl.
CPC ............ *G06V 40/193* (2022.01); *G06V 10/26* (2022.01); *G06V 10/82* (2022.01); *G06V 20/46* (2022.01); *G06V 40/171* (2022.01)

(58) Field of Classification Search
CPC .... G06V 10/26; G06V 10/454; G06V 10/764; G06V 10/82; G06V 20/46; G06V 40/171; G06V 40/18; G06V 40/193
See application file for complete search history.

(56) References Cited

U.S. PATENT DOCUMENTS

2021/0319585 A1*  10/2021  Odobez ................ G06V 40/193
2023/0005180 A1*   1/2023  Zachrisson ............... G06T 7/74

* cited by examiner

*Primary Examiner* — Michael J Vanchy, Jr.

(57) ABSTRACT

Disclosed are a method and apparatus for measuring a gaze difference based on gaze estimation. Video data of a testee gazing at a visual target is obtained, and a face image sequence is obtained from the video data. The face image sequence is input into a first neural network for key frame extraction to obtain a first and second gaze position face image. The face images are input into a second neural network for facial feature point extraction. Cropping is performed based on facial feature point coordinates to obtain a first and second eye region image. A gaze difference estimation network is trained to obtain a trained gaze difference estimation network. The first and second eye region images are input into the trained gaze difference estimation network to obtain a predicted gaze difference between the first and second eye region images.

20 Claims, 2 Drawing Sheets

METHOD AND APPARATUS FOR MEASURING GAZE DIFFERENCE BASED ON GAZE ESTIMATION

CROSS REFERENCE TO RELATED APPLICATIONS

The present application claims the benefit of Chinese Patent Application No. 202211693813.4 filed on Dec. 28, 2022, the contents of which are incorporated herein by reference in their entirety.

TECHNICAL FIELD

The present application relates to the technical field of gaze tracking, and in particular, to a method and apparatus for measuring a gaze difference based on gaze estimation.

BACKGROUND

An accurately measured gaze difference is of great help to squint surgery design, disease type diagnosis, disease condition estimation, and the like. At present, squint is one of eye diseases with the highest incidence in children worldwide. Children are in a critical period of vision development. Squint may affect lifelong vision development. If no timely measures are taken to correct squint, some vision will be permanently lost. Currently, a gaze difference is mainly measured by a professional inspector through a traditional method of alternate covering with a prism and a flashlight. The traditional measurement method for children has difficulty in cooperation, resulting in a large error of measured degrees and the like. In addition, although some new methods for measuring a gaze difference, such as an image pixel calculation method of corneal light reflexes, are gradually emerging, and special devices such as a virtual reality (VR) device, an eye tracker, and a display are used for measurement, the technology is not mature, is difficult to operate, and has high measurement costs.

SUMMARY

In view of this, embodiments of the present application provide a method for measuring a gaze difference based on gaze estimation, which is highly operable, reduces calculation costs, and improves accuracy of measuring a gaze difference.

According to a first aspect, the present application provides a method for measuring a gaze difference based on gaze estimation.

The present application is implemented by the following technical solution:

The method for measuring a gaze difference based on gaze estimation includes:
  obtaining video data of a testee gazing at a visual target, and obtaining a face image sequence of the testee based on the video data;
  inputting the face image sequence into a first neural network for key frame extraction to obtain a first gaze position face image and a second gaze position face image;
  inputting the first gaze position face image and the second gaze position face image into a second neural network for facial feature point extraction to obtain first facial feature point coordinates and second facial feature point coordinates, and performing cropping based on the first facial feature point coordinates and the second facial feature point coordinates to obtain a first eye region image and a second eye region image;
  training a gaze difference estimation network by using an eye region image set in a public dataset to obtain a trained gaze difference estimation network; and
  inputting the first eye region image and the second eye region image into the trained gaze difference estimation network to obtain a predicted gaze difference between the first eye region image and the second eye region image.

In a preferred example of the present application, it may be further set that before the inputting the first eye region image and the second eye region image into the trained gaze difference estimation network, the method further includes:
  splicing the first eye region image and the second eye region image to obtain a spliced image, and inputting the spliced image into the trained gaze difference estimation network to obtain a predicted gaze difference of the spliced image.

In a preferred example of the present application, it may be further set that the performing cropping based on the first facial feature point coordinates and the second facial feature point coordinates to obtain a first eye region image and a second eye region image includes:
  determining a centroid and an axis-aligned bounding box (AABB) of eye feature points based on the first facial feature point coordinates and the second facial feature point coordinates, and cropping the first gaze position face image and the second gaze position face image by using the centroid as a cropping center and the AABB as a size of a cropping region, to obtain the first eye region image corresponding to the first gaze position face image and the second eye region image corresponding to the second gaze position face image.

In a preferred example of the present application, it may be further set that the training a gaze difference estimation network by using an eye region image set in a public dataset to obtain a trained gaze difference estimation network includes:
  obtaining the eye region image set from the public dataset, selecting two training images from the eye region image set, obtaining a real gaze difference based on gaze direction labels of the two training images, inputting the two training images into the gaze difference estimation network to obtain a predicted gaze difference between the two training images, constructing a loss function based on the real gaze difference and the predicted gaze difference, optimizing parameters of the gaze difference estimation network based on the loss function, and iterating the foregoing optimizing until the loss function converges, to obtain the trained gaze difference estimation network.

In a preferred example of the present application, it may be further set that the optimizing parameters of the gaze difference estimation network based on the loss function further includes:
  optimizing the parameters of the gaze difference estimation network based on an adaptive moment estimation method.

In a preferred example of the present application, it may be further set that the gaze difference estimation network includes a feature extraction module and a difference estimation module. An output end of the feature extraction module is connected to an input end of the difference estimation module. The feature extraction module is configured to perform feature extraction on eye region images input into the gaze difference estimation network, and output a gaze difference feature of the eye region images. The difference estimation module is configured to perform difference estimation on the gaze difference feature input by the feature extraction module, to obtain a predicted gaze difference between the eye region images.

According to a second aspect, the present application provides an apparatus for measuring a gaze difference based on gaze estimation.

The present application is implemented by the following technical solution:

The apparatus for measuring a gaze difference based on gaze estimation includes:

a data obtaining module configured to obtain video data of a testee gazing at a visual target, and obtain a face image sequence of the testee based on the video data;

a key frame extraction module configured to input the face image sequence into a first neural network for key frame extraction to obtain a first gaze position face image and a second gaze position face image;

an eye cropping module configured to input the first gaze position face image and the second gaze position face image into a second neural network for facial feature point extraction to obtain first facial feature point coordinates and second facial feature point coordinates, and perform cropping based on the first facial feature point coordinates and the second facial feature point coordinates to obtain a first eye region image and a second eye region image;

a difference estimation network training module configured to train a gaze difference estimation network by using an eye region image set in a public dataset to obtain a trained gaze difference estimation network; and a gaze difference measurement module configured to input the first eye region image and the second eye region image into the trained gaze difference estimation network to obtain a predicted gaze difference between the first eye region image and the second eye region image.

In a preferred example of the present application, it may be further set that the apparatus further includes:

an image splicing module configured to splice the first eye region image and the second eye region image to obtain a spliced image.

According to a third aspect, the present application provides a computing device.

The present application is implemented by the following technical solution:

The computer device includes a memory, a processor, and a computer program stored in the memory and executable on the processor. The processor, when executing the computer program, implements any of steps of the foregoing method for measuring a gaze difference based on gaze estimation.

According to a fourth aspect, the present application provides a computer-readable storage medium.

The present application is implemented by the following technical solution:

The computer-readable storage medium stores a computer program. The computer program, when executed by a processor, implements any of steps of the foregoing method for measuring a gaze difference based on gaze estimation.

In summary, in comparison with the prior art, beneficial effects brought by the technical solutions provided in the embodiments of the present application at least include: The video data of the testee is acquired. The face image sequence is obtained from the video data. Facial feature point extraction and eye region cropping are performed through the constructed neural network to obtain the first eye region image and the second eye region image. Further, the gaze difference between the first eye region image and the second eye region image is obtained by using the trained gaze difference estimation network. Accuracy of measuring the gaze difference can be effectively improved. In addition, operations are simple and convenient. There is no need for a professional device. Subsequent measurement work can be completed only by capturing an appropriate video. Operability is high, and calculation costs are reduced.

DETAILED DESCRIPTION

This specific embodiment is merely an explanation of the present application, but it does not limit the present application. Those skilled in the art can make modifications without creative contribution to this embodiment as needed after reading this specification, but these modifications are protected by patent law as long as they fall within the scope of the claims of the present application.

To make the objectives, technical solutions, and advantages of the embodiments of the present application clearer, the following clearly and completely describes the technical solutions in the embodiments of the present application with reference to the accompanying drawings in the embodiments of the present application. Apparently, the described embodiments are some rather than all of the embodiments of the present application. All other embodiments obtained by those of ordinary skill in the art based on the embodiments of the present application without creative efforts shall fall within the protection scope of the present application.

In addition, the term "and/or" used in the present application merely describes an association relationship between associated objects, and indicates that three types of relationships may exist. For example, A and/or B may indicate that A exists alone, both A and B exist, or B exists alone. In addition, unless otherwise specified, the character "/" used in the present application generally indicates that the associated objects are in an "or" relationship.

Terms such as "first" and "second" in the present application are used to distinguish same or similar items that have a basically same effect and function. It should be understood that "first", "second", and "nth" do not have a logical or temporal dependency relationship, nor do they limit a quantity and an execution order.

The embodiments of the present application are further described below in detail with reference to the accompanying drawings of this specification.

Figure 1:
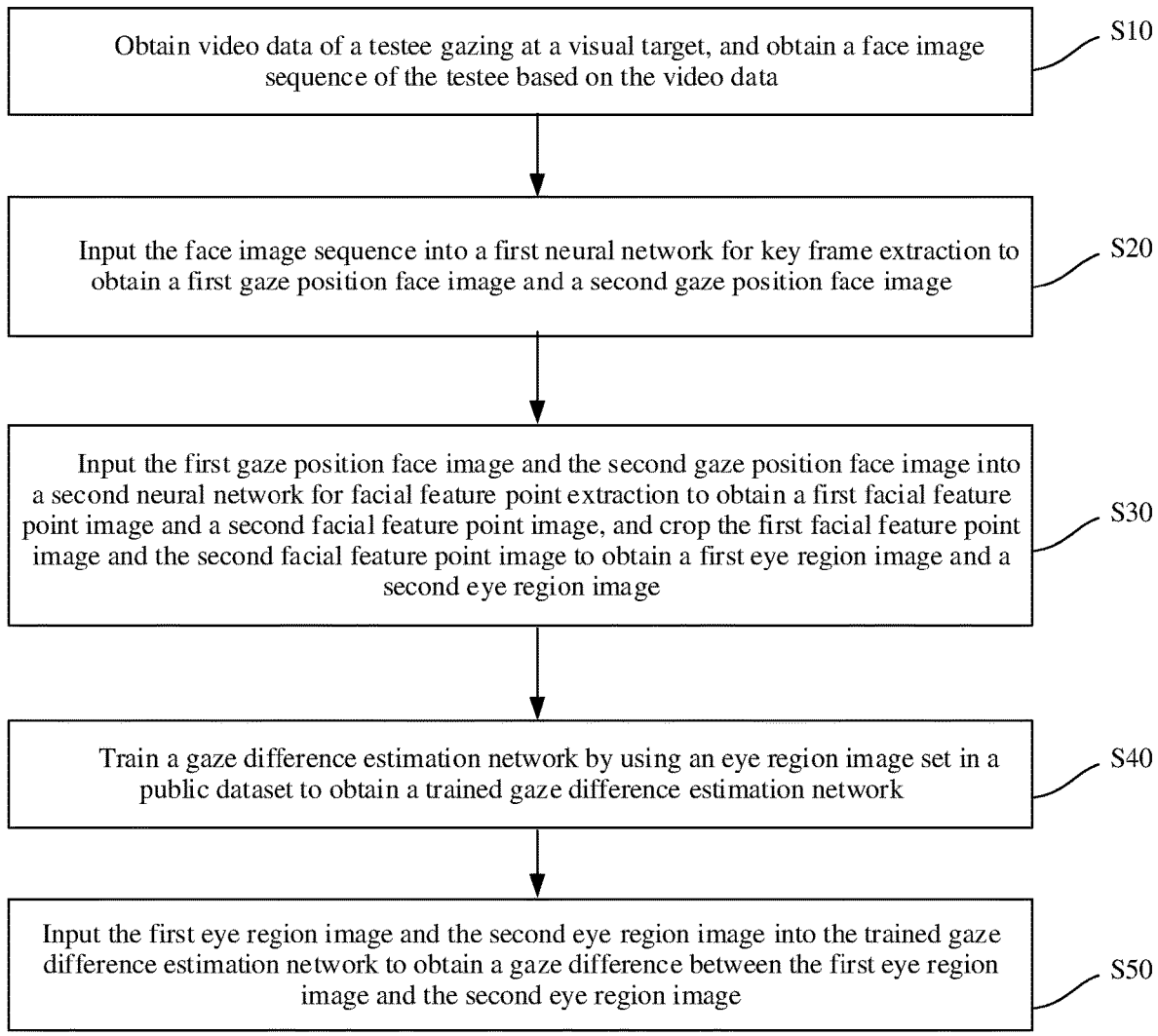
FIG. 1 is a schematic flowchart of a method for measuring a gaze difference based on gaze estimation according to an exemplary embodiment of the present application.

In an embodiment of the present application, a method for measuring a gaze difference based on gaze estimation is provided. The gaze difference is an angle difference between gaze direction labels. As shown in FIG. 1, main steps are described as follows:

S10: Obtain video data of a testee gazing at a visual target, and obtain a face image sequence of the testee based on the video data.

Specifically, a camera is disposed directly in front of the testee. The testee gazes at a far visual target and a near visual target based on a standardized cover process. The video data of the testee gazing at the visual targets, including eye data, is collected through the camera. A quantity of required face image sequences is set by using an OpenCV correlation function based on the captured video data. The face image sequence of the testee is obtained from the video data. Video information is converted into image information for processing. Operation costs are low.

The standardized cover process may be continuously capturing a cover-uncover and/or alternate cover test video of a patient at a first gaze position. For example:

Clip A: Both eyes are at the first gaze position, that is, gaze at a coaxial visual target directly in front of the patient (for 5 s). If an initial head position of the patient is abnormal (such as obvious face rotation, head tilt, or mandibular elevation or adduction), the head position of the patient is corrected before video capture.

Clip B (cover-uncover): First, cover the right eye for 3 s and then uncover it. Then, both eyes gaze at the first gaze position for 5 s. Next, cover the left eye for 3 s and then uncover it. Finally, both eyes gaze at the first gaze position for 5 s again.

Clip C (alternate cover): Cover the right eye for 2 s and then rapidly switch to cover the left eye for 2 s. Repeat this process 4 times.

Clip D: Gaze at the first gaze position (for 5 s).

Perform the foregoing A-D process for the far visual target (at a distance of 5 m) and the near visual target (at a distance of 33 cm).

In the standardized cover process, cover duration may be adjusted based on an actual situation. A tripod or another mobile phone fastener may be used to maximally avoid shaking during the video capture. The testee may wear refractive error correction glasses during the video capture. The visual target may be selected based on the age of the patient to control the patient's attention and regulation. If the patient's vision decreases, a threshold visual target may be selected for an amblyopic eye. The visual target should be coaxial with the camera. The video should be captured in a well-lit room with ambient light.

S20: Input the face image sequence into a first neural network for key frame extraction to obtain a first gaze position face image and a second gaze position face image.

Specifically, the face image sequence obtained in step S10 is input into the first neural network to obtain a classification result of the face image sequence. Key frame extraction is performed based on the classification result to obtain the first gaze position face image and the second gaze position face image.

A structure of the first neural network is a deep residual network Resnet1. The deep residual network Resnet1 receives a 3-channel color image input. Specifically, the obtained face image sequence of the testee is input into the deep residual network Resnet1 such that a covering condition of each image can be obtained. Covering conditions are classified into 4 types: the left eye is covered, the right eye is covered, both the left eye and the right eye are covered, and neither the left eye nor the right eye is covered. The covering conditions of the face image sequence are sorted in chronological order, and images with a change in the covering condition are used as key frame images. Key frame images belonging to a reference gaze position and a deviation gaze position are extracted based on the classification result. The key frame image belonging to the reference gaze position is the first gaze position face image, and the key frame image belonging to the deviation gaze position is the second gaze position face image. The key frame images are further classified into a reference gaze position, a dominant deviation gaze position, a maximum deviation gaze position, and the like based on different change conditions.

The reference gaze position may also be referred to as a primary gaze position or a monocular gaze position, and is defined as a gaze position of a gaze eye in three-dimensional coordinates after one eye is covered. The visual target may be directly in front of the face or in another direction that causes eye movement. The reference gaze position, the dominant deviation gaze position, and the maximum deviation gaze position are described by using a frontal gaze as an example.

A deviation angle of the dominant deviation gaze position may be an angle at which a squint eye deviates during a binocular gaze. One eye is a gaze eye and the other eye is the squint eye.

An alternate monocular gaze is formed by alternately covering one eye with an opaque baffle to break binocular fusion. In this case, the maximum deviation gaze position can be induced. For example, during alternate covering, the baffle covering the right eye is to be moved to cover the left eye, and a gaze position of the right eye when the baffle is just removed from the right eye is a maximum deviation gaze position of the right eye.

Specifically, the reference gaze position, the dominant deviation gaze position, and the maximum deviation gaze position of each eye are calculated in pairs. For example, the reference gaze position, the dominant deviation gaze position, and the maximum deviation gaze position are calculated after a gaze at a first visual target (near vision). Then, the foregoing calculation is repeated after a gaze at a second visual target (far vision). Far vision first or near vision first may be determined based on actual clinical needs. Changes in the covering condition may be classified into 12 types: a change from the condition in which neither the left eye nor the right eye is covered to the condition in which the left eye is covered, change from the condition in which neither the left eye nor the right eye is covered to the condition in which the right eye is covered, change from the condition in which neither the left eye nor the right eye is covered to the condition in which both the left eye and the right eye are covered, change from the condition in which the left eye is covered to the condition in which neither the left eye nor the right eye is covered, change from the condition in which the left eye is covered to the condition in which the right eye is covered, change from the condition in which the left eye is covered to the condition in which both the left eye and the right eye are covered, change from the condition in which the right eye is covered to the condition in which neither the left eye nor the right eye is covered, change from the condition in which the right eye is covered to the condition in which the left eye is covered, change from the condition in which the right eye is covered to the condition in which both the left eye and the right eye are covered, change from the condition in which both the left eye and the right eye are covered to the condition in which the left eye is covered, change from the condition in which both the left eye and the right eye are covered to the condition in which the right eye is covered, and change from the condition in which both the left eye and the right eye are covered to the condition in which neither the left eye nor the right eye is covered.

S30: Input the first gaze position face image and the second gaze position face image into a second neural network for facial feature point extraction to obtain first facial feature point coordinates and second facial feature point coordinates, and perform cropping based on the first facial feature point coordinates and the second facial feature point coordinates to obtain a first eye region image and a second eye region image. All coordinates in the present application belong to a same camera coordinate system.

Specifically, the second neural network is a deep residual network Resnet2, which receives a 3-channel color image input and outputs an N×2-dimensional vector. The N×2-dimensional vector represents two-dimensional coordinates of N feature points. A network model of the second neural network is a Resnet2 model. The face image sequence is input into the Resnet2 model such that N predicted feature point heat maps of the face image sequence can be obtained, where N is greater than 1.

Preferably, the network model of the second neural network is pre-trained to improve output accuracy of the network model of the second neural network. The pre-training is specifically as follows: Construct an initial second neural network. Obtain a face image from a public dataset. Label real feature point coordinates on the face image. Convert the real feature point coordinates into a real feature point heat map. Specifically, obtain a face image from a public face image database, process the face image, label N real feature point coordinates, that is, label two-dimensional positions of a nose, a mouth, and irises, and perform sampling through Gaussian distribution to convert the N real feature point coordinates into N feature point heat maps. Input the face image into the initial second neural network to obtain a predicted feature point heat map of the face image. Construct an L1 loss function based on the real feature point heat map and the predicted feature point heat map. Perform supervised training on the initial second neural network based on the L1 loss function until the L1 loss function converges to obtain a trained initial second neural network as the second neural network.

After the second neural network is trained to preset accuracy (a normalized pixel error is at most 5%), the acquired face image sequence is input into the trained second neural network such that the feature point heat maps of the face image sequence can be obtained. Then, the feature point heat map is converted into the feature point coordinates, which are used to construct a three-dimensional face model during subsequent three-dimensional face reconstruction.

The obtained first gaze position face image and second gaze position face image are input into the deep residual network Resnet2 to obtain the first facial feature point coordinates of the first gaze position face image and the second facial feature point coordinates of the second gaze position face image. The facial feature point coordinates include eye feature point coordinates. The cropping is performed based on the first facial feature point coordinates and the second facial feature point coordinates to obtain the first eye region image and the second eye region image. The images are cropped to obtain the eye region images. This helps improve accuracy of subsequently measuring the gaze difference through a difference estimation network.

Preferably, performing the cropping to obtain the eye region images includes: Determine a centroid and an AABB of eye feature points based on the first facial feature point coordinates and the second facial feature point coordinates, and crop the first gaze position face image and the second gaze position face image by using the centroid as a cropping center and the AABB as a size of a cropping region, to obtain the first eye region image and the second eye region image.

The first gaze position face image is used as an example. The centroid and the AABB of the eye feature points are first determined based on the first facial feature point coordinates of the first gaze position face image, namely, the reference gaze position, that are extracted by the second neural network. The first gaze position face image is cropped by using the centroid of the eye feature points as the cropping center and the AABB as the size of the cropping region to obtain the relatively accurate first eye region image. It should be noted that a bounding box algorithm is a method for solving an optimal bounding space of a discrete point set. Common bounding box algorithms include the AABB, a bounding sphere, an oriented bounding box (OBB), and a fixed-direction hull (FDH). The AABB was first applied and has simple construction. This can improve efficiency of geometric operations.

S40: Train a gaze difference estimation network by using an eye region image set in a public dataset to obtain a trained gaze difference estimation network.

Specifically, the eye region image set in the public dataset is used to train the gaze difference estimation network. Each eye region image in the eye region image set has a gaze direction label in a corresponding camera coordinate system, namely, "eye region image-gaze direction". A process of determining the gaze direction label is as follows: Dispose a head fixing table. Dispose a color camera in front of the head fixing table. Dispose a plurality of visual targets at equal angular intervals relative to the head fixing table. The equal angular intervals are equal angular intervals in a horizontal direction and a vertical direction. Guide a to-be-measured person to place the head on the head fixing table and sequentially gaze at different visual targets. Use the color camera to capture an eye region image of the to-be-measured person gazing at a first visual target, and label a corresponding gaze direction based on an angle of the first visual target. The angle of the first visual target is a preset angle of the first visual target relative to the head fixing table. Then, use the color camera to capture an eye region image of the to-be-measured person gazing at a second visual target, and label a corresponding gaze direction based on an angle of the second visual target. Eye region images of the to-be-measured person gazing at all visual targets are captured in the same manner. To improve accuracy of model training, a quantity of training datasets needs to be ensured. Therefore, eye region images of a plurality of measured persons are obtained. To minimize acquisition errors, an eye region image of each measured person is captured at least once.

Preferably, training the gaze difference estimation network to obtain the trained gaze difference estimation network specifically includes: Randomly select two training images from the eye region image set each time. Obtain a real gaze difference between the two images based on gaze direction labels of the two training images. Input the two images into the initially constructed gaze difference estimation network. Output a predicted gaze difference between the two images. Construct a loss function based on the real gaze difference (a labeled gaze angle difference) and the predicted gaze difference. Optimize parameters of the initially constructed gaze difference estimation network based on the loss function until the loss function converges, to obtain the trained gaze difference estimation network. The trained gaze difference estimation network is used as a model for subsequent gaze difference measurement. The constructed loss function is an L1 loss function, namely, a mean absolute error.

Preferably, during the optimization, the parameters of the gaze difference estimation network are optimized based on an adaptive moment estimation method. Adaptive learning rates for different parameters are calculated from estimates of first and second matrices of gradients. The adaptive moment estimation method requires small storage capacity and can effectively improve calculation efficiency. In addition, the method is suitable for scenarios of gradient sparseness and noise, and can improve the accuracy of model training.

S50: Input the first eye region image and the second eye region image into the trained gaze difference estimation network to obtain a predicted gaze difference between the first eye region image and the second eye region image.

Specifically, the first eye region image and the second eye region image obtained after the cropping are input into the trained gaze difference estimation network to obtain the predicted gaze difference between the first eye region image and the second eye region image.

Preferably, a structure of the gaze difference estimation network includes a feature extraction module and a difference estimation module. An output end of the feature extraction module is connected to an input end of the difference estimation module. The feature extraction module is configured to perform feature extraction on eye region images input into the gaze difference estimation network, and output a gaze difference feature of the eye region images. The difference estimation module is configured to perform difference estimation on the gaze difference feature input by the feature extraction module, to obtain a predicted gaze difference between the eye region images.

Preferably, the first eye region image and the second eye region image are spliced to obtain a spliced image, and the spliced image is input into the trained gaze difference estimation network to obtain a predicted gaze difference of the spliced image. Specifically, the 3-channel first eye region image and the 3-channel second eye region image are spliced to obtain the 6-channel spliced image. The spliced image is input into the trained gaze difference estimation network. The feature extraction module of the gaze difference estimation network performs feature extraction to output a gaze difference feature of the spliced image. Then, the gaze difference feature is input into the difference estimation module of the gaze difference estimation network. The difference estimation module obtains the predicted gaze difference between the first eye region image and the second eye region image in the spliced image, namely, a predicted gaze difference between the reference gaze position and the deviation gaze position. The two images are spliced and then input into the trained gaze difference estimation network. This can improve a utilization rate of network parameters and network operation efficiency, and further improve accuracy of the predicted gaze difference obtained by the gaze difference estimation network. The feature extraction is to extract features of the input image through a convolutional layer and a pooling layer of the gaze difference estimation network. Different filters or convolution kernels may be learned. Different image features, such as edges, textures, and colors, may be extracted by performing convolution operations on the input image through the convolution kernels. The pooling layer may perform operations such as maximum pooling and average pooling on a feature map output by the convolutional layer, to reduce a spatial dimension of the feature map and a quantity of parameters, and retain main feature information.

Further, an optical formula may be used to convert a prism degree to a circular degree to assist in determining eye movement of the testee.

In the method provided in this embodiment, subsequent calculation can be performed only by using a camera to capture appropriate face images of the testee. There is no need for another professional device and a high degree of cooperation of the testee. The method is simple to operate and highly operable. When a gaze position of the testee needs to be monitored for a long time, the method has great advantages that the testee does not need to frequently go to a measurement agency for measurement. Remote measurement can be carried out only by capturing a video at home and then transmitting the data.

Figure 2:
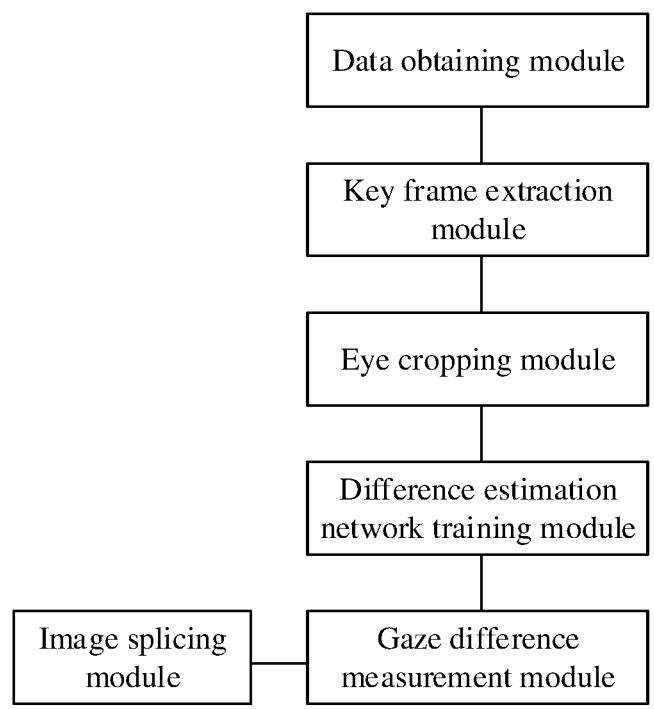
FIG. 2 is a schematic structural diagram of an apparatus for measuring a gaze difference based on gaze estimation according to an exemplary embodiment of the present application.

The present application further provides an apparatus for measuring a gaze difference based on gaze estimation. As shown in FIG. 2, the apparatus includes a data obtaining module, a key frame extraction module, an eye cropping module, a difference estimation network training module, and a gaze difference measurement module.

The data obtaining module is configured to obtain video data of a testee gazing at a visual target, and obtain a face image sequence of the testee based on the video data. The data obtaining module may be, for example, a high-definition camera, a three-dimensional camera, a camera, or a webcam.

The key frame extraction module is configured to input the face image sequence into a first neural network for key frame extraction to obtain a first gaze position face image and a second gaze position face image. The key frame extraction module may be, for example, a graphics processing unit (GPU), a central processing unit (CPU), or a device equipped with a CPU and a GPU, such as a server, a personal computer, or a smartphone.

The eye cropping module is configured to input the first gaze position face image and the second gaze position face image into a second neural network for facial feature point extraction to obtain first facial feature point coordinates and second facial feature point coordinates, and perform cropping based on the first facial feature point coordinates and the second facial feature point coordinates to obtain a first eye region image and a second eye region image. The eye cropping module may be, for example, a GPU, a CPU, or a device equipped with a CPU and a GPU, such as a server, a personal computer, or a smartphone.

The difference estimation network training module is configured to train a gaze difference estimation network by using an eye region image set in a public dataset to obtain a trained gaze difference estimation network. The difference estimation network training module may be, for example, a GPU, a CPU, or a device equipped with a CPU and a GPU, such as a server, a personal computer, or a smartphone.

The gaze difference measurement module is configured to input the first eye region image and the second eye region image into the trained gaze difference estimation network to obtain a predicted gaze difference between the first eye region image and the second eye region image. The gaze difference measurement module may be, for example, a GPU, a CPU, or a device equipped with a CPU and a GPU, such as a server, a personal computer, or a smartphone.

Preferably, the apparatus further includes an image splicing module configured to splice the first eye region image and the second eye region image to obtain a spliced image. The image splicing module may be, for example, a GPU, a CPU, or a device equipped with a CPU and a GPU, such as a server, a personal computer, or a smartphone.

In an embodiment, a computer device is provided. The computer device may be a server.

The computer device includes a processor, a memory, a network interface, and a database that are connected through a system bus. The processor of the computer device is configured to provide calculation and control capabilities.

The memory of the computer device includes a nonvolatile storage medium and an internal memory. The nonvolatile storage medium stores an operating system, a computer program, and the database. The internal memory provides an environment for operation of the operating system and the computer program in the nonvolatile storage medium. The network interface of the computer device is configured to communicate with an external terminal through a network. The computer program, when executed by the processor, implements any of the foregoing method for measuring a gaze difference based on gaze estimation.

In an embodiment, a computer-readable storage medium is provided, including a memory, a processor, and a computer program stored in the memory and executable on the processor. The processor executes the computer program to implement any of the foregoing method for measuring a gaze difference based on gaze estimation.

Those of ordinary skill in the art may understand that all or some of the procedures in the method of the foregoing embodiments may be implemented by a computer program instructing related hardware. The computer program may be stored in a nonvolatile computer-readable storage medium. When the computer program is executed, the procedures in the embodiments of the foregoing method may be performed. Any reference to a memory, a storage, a database, or other mediums used in various embodiments provided in the present application may include a nonvolatile memory and/or a volatile memory. The nonvolatile memory may include a read-only memory (ROM), a programmable ROM (PROM), an electrically programmable ROM (EPROM), an electrically erasable programmable ROM (EEPROM), or a flash memory. The volatile memory may include a random access memory (RAM) or an external cache memory. As description rather than limitation, the RAM may be obtained in a plurality of forms, such as a static RAM (SRAM), a dynamic RAM (DRAM), a synchronous DRAM (SDRAM), a double data rate SDRAM (DDRSDRAM), an enhanced SDRAM (ESDRAM), a synchronization link (synchlink) DRAM (SLDRAM), a Rambus direct RAM (RDRAM), a direct Rambus dynamic RAM (DRDRAM), and a Rambus dynamic RAM (RDRAM).

It may be clearly understood by a person skilled in the art that, for convenient and concise description, division into the foregoing functional units or modules is merely used as an example for illustration. In actual application, the foregoing functions may be allocated to different functional units or modules and implemented according to a requirement. That is, an inner structure of the system in the present application is divided into different functional units or modules to implement all or some of the foregoing functions.

The invention claimed is:

1. A method for measuring a gaze difference based on gaze estimation, comprising:
    obtaining video data of a testee gazing at a visual target, and obtaining a face image sequence of the testee based on the video data;
    inputting the face image sequence into a first neural network for key frame extraction to obtain a first gaze position face image and a second gaze position face image;
    inputting the first gaze position face image and the second gaze position face image into a second neural network for facial feature point extraction to obtain first facial feature point coordinates and second facial feature point coordinates, and performing cropping based on the first facial feature point coordinates and the second facial feature point coordinates to obtain a first eye region image and a second eye region image;
    wherein the first eye region image corresponds to the first gaze position face image and the second eye region image corresponds to the second gaze position face image;
    training a gaze difference estimation network by using an eye region image set in a public dataset to obtain a trained gaze difference estimation network; and
    inputting the first eye region image and the second eye region image into the trained gaze difference estimation network to obtain a predicted gaze difference between the first eye region image and the second eye region image.

2. The method for measuring a gaze difference based on gaze estimation according to claim 1, before the inputting the first eye region image and the second eye region image into the trained gaze difference estimation network, further comprising:
    splicing the first eye region image and the second eye region image to obtain a spliced image, and inputting the spliced image into the trained gaze difference estimation network to obtain a predicted gaze difference of the spliced image.

3. A computer device, comprising a memory, a processor, and a computer program stored in the memory, wherein the processor executes the computer program to implement steps of the method according to claim 2.

4. A non-transitory computer-readable storage medium, wherein the computer-readable storage medium stores a computer program, and the computer program, when executed by a processor, implements steps of the method according to claim 2.

5. The method for measuring a gaze difference based on gaze estimation according to claim 1, wherein the performing cropping based on the first facial feature point coordinates and the second facial feature point coordinates to obtain a first eye region image and a second eye region image comprises:
    determining a centroid and an axis-aligned bounding box (AABB) of eye feature points based on the first facial feature point coordinates and the second facial feature point coordinates, and cropping the first gaze position face image and the second gaze position face image by using the centroid as a cropping center and the AABB as a size of a cropping region, to obtain the first eye region image corresponding to the first gaze position face image and the second eye region image corresponding to the second gaze position face image.

6. A computer device, comprising a memory, a processor, and a computer program stored in the memory, wherein the processor executes the computer program to implement steps of the method according to claim 5.

7. A non-transitory computer-readable storage medium, wherein the computer-readable storage medium stores a computer program, and the computer program, when executed by a processor, implements steps of the method according to claim 5.

8. The method for measuring a gaze difference based on gaze estimation according to claim 1, wherein the training a gaze difference estimation network by using an eye region image set in a public dataset to obtain a trained gaze difference estimation network comprises:
    obtaining the eye region image set from the public dataset, selecting two training images from the eye region image set, obtaining a real gaze difference based on gaze direction labels of the two training images, inputting the two training images into the gaze difference estimation network to obtain a predicted gaze difference between the two training images, constructing a loss function based on the real gaze difference and the predicted gaze difference, optimizing parameters of the gaze difference estimation network based on the loss function, and iterating the foregoing optimizing until the loss function converges, to obtain the trained gaze difference estimation network.

9. The method for measuring a gaze difference based on gaze estimation according to claim 8, wherein the optimizing parameters of the gaze difference estimation network based on the loss function further comprises:
optimizing the parameters of the gaze difference estimation network based on an adaptive moment estimation method.

10. A computer device, comprising a memory, a processor, and a computer program stored in the memory, wherein the processor executes the computer program to implement steps of the method according to claim 9.

11. A non-transitory computer-readable storage medium, wherein the computer-readable storage medium stores a computer program, and the computer program, when executed by a processor, implements steps of the method according to claim 9.

12. A computer device, comprising a memory, a processor, and a computer program stored in the memory, wherein the processor executes the computer program to implement steps of the method according to claim 8.

13. A non-transitory computer-readable storage medium, wherein the computer-readable storage medium stores a computer program, and the computer program, when executed by a processor, implements steps of the method according to claim 8.

14. The method for measuring a gaze difference based on gaze estimation according to claim 1, wherein the gaze difference estimation network comprises a feature extraction module and a difference estimation module, and an output end of the feature extraction module is connected to an input end of the difference estimation module; the feature extraction module is configured to perform feature extraction on eye region images input into the gaze difference estimation network, and output a gaze difference feature of the eye region images; and the difference estimation module is configured to perform difference estimation on the gaze difference feature input by the feature extraction module, to obtain a predicted gaze difference between the eye region images.

15. A computer device, comprising a memory, a processor, and a computer program stored in the memory, wherein the processor executes the computer program to implement steps of the method according to claim 14.

16. A non-transitory computer-readable storage medium, wherein the computer-readable storage medium stores a computer program, and the computer program, when executed by a processor, implements steps of the method according to claim 14.

17. A computer device, comprising a memory, a processor, and a computer program stored in the memory, wherein the processor executes the computer program to implement steps of the method according to claim 1.

18. A non-transitory computer-readable storage medium, wherein the computer-readable storage medium stores a computer program, and the computer program, when executed by a processor, implements steps of the method according to claim 1.

19. An apparatus for measuring a gaze difference based on gaze estimation, comprising:
a data obtaining module configured to obtain video data of a testee gazing at a visual target, and obtain a face image sequence of the testee based on the video data;
a key frame extraction module configured to input the face image sequence into a first neural network for key frame extraction to obtain a first gaze position face image and a second gaze position face image;
an eye cropping module configured to input the first gaze position face image and the second gaze position face image into a second neural network for facial feature point extraction to obtain first facial feature point coordinates and second facial feature point coordinates, and perform cropping based on the first facial feature point coordinates and the second facial feature point coordinates to obtain a first eye region image and a second eye region image;
wherein the first eye region image corresponds to the first gaze position face image and the second eye region image corresponds to the second gaze position face image;
a difference estimation network training module configured to train a gaze difference estimation network by using an eye region image set in a public dataset to obtain a trained gaze difference estimation network; and
a gaze difference measurement module configured to input the first eye region image and the second eye region image into the trained gaze difference estimation network to obtain a predicted gaze difference between the first eye region image and the second eye region image.

20. The apparatus for measuring a gaze difference based on gaze estimation according to claim 19, further comprising:
an image splicing module configured to splice the first eye region image and the second eye region image to obtain a spliced image.

* * * * *